(12) United States Patent
Johnstone et al.

(10) Patent No.: US 6,831,453 B2
(45) Date of Patent: Dec. 14, 2004

(54) DETERMINING THE MAGNITUDE OF PULSES

(75) Inventors: Colin Johnstone, Fife (GB); Alexander John Stephen, West Lothian (GB)

(73) Assignee: Agilent Technologies, Inc., Palo Alto, CA (US)

(*) Notice: Subject to any disclaimer, the term of this patent is extended or adjusted under 35 U.S.C. 154(b) by 63 days.

(21) Appl. No.: 10/293,806

(22) Filed: Nov. 13, 2002

(65) Prior Publication Data

US 2003/0094935 A1 May 22, 2003

(51) Int. Cl.[7] .................. G01R 19/00; H03K 5/153; G06F 7/00
(52) U.S. Cl. .................. 324/102; 327/72; 708/202
(58) Field of Search .................. 324/102, 103 P; 327/68, 72, 73; 708/202

(56) References Cited

U.S. PATENT DOCUMENTS

| | | | | |
|---|---|---|---|---|
| 3,947,769 A | | 3/1976 | Rousos et al. .............. 325/320 |
| 4,034,340 A | * | 7/1977 | Sant'Agostino ............. 714/705 |
| 4,499,419 A | * | 2/1985 | Bockett-Pugh .............. 324/102 |
| 5,545,990 A | * | 8/1996 | Kiefer et al. ................ 324/307 |
| 5,872,468 A | * | 2/1999 | Dyke .......................... 327/72 |
| 5,933,455 A | | 8/1999 | Hendrickson et al. ....... 375/261 |
| 2002/0003814 A1 | | 1/2002 | Roth et al. .................. 370/516 |

FOREIGN PATENT DOCUMENTS

| | | |
|---|---|---|
| EP | 0394064 A2 | 10/1990 |
| EP | 1148682 A2 | 10/2001 |

OTHER PUBLICATIONS

English translation of Japanese Patent document No. JP P2000-293681A, Oct. 2000.

* cited by examiner

*Primary Examiner*—Ernest Karlsen

(57) ABSTRACT

The magnitude of a pulse in a signal having both positive and negative polarity pulses (for example, a ternary PDH signal) is determined by measuring the magnitude of multiple samples of the signal. A reference level for the signal is determined from a plurality of these sample magnitudes, and the magnitude of a pulse in the signal is determined from the sample magnitudes and the reference level.

8 Claims, 3 Drawing Sheets

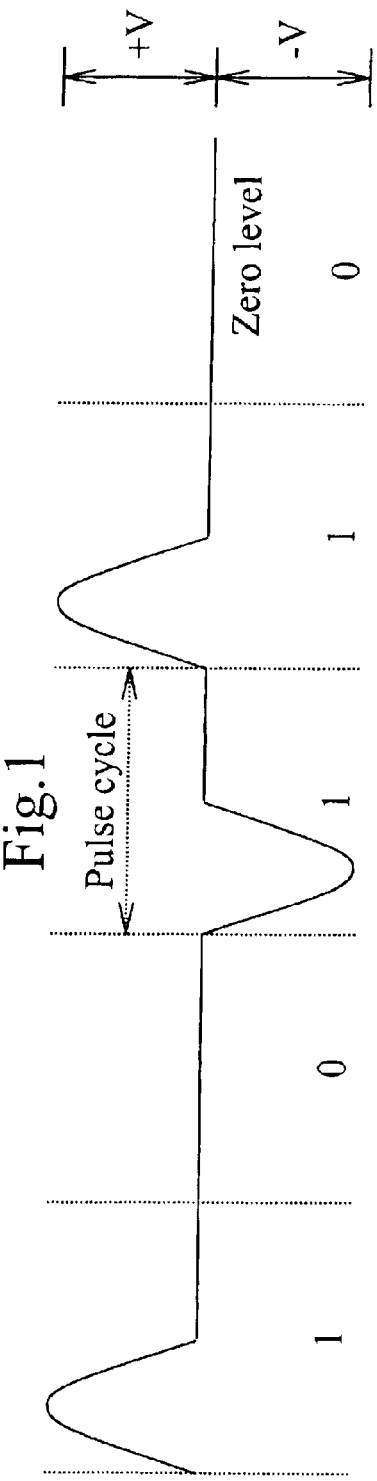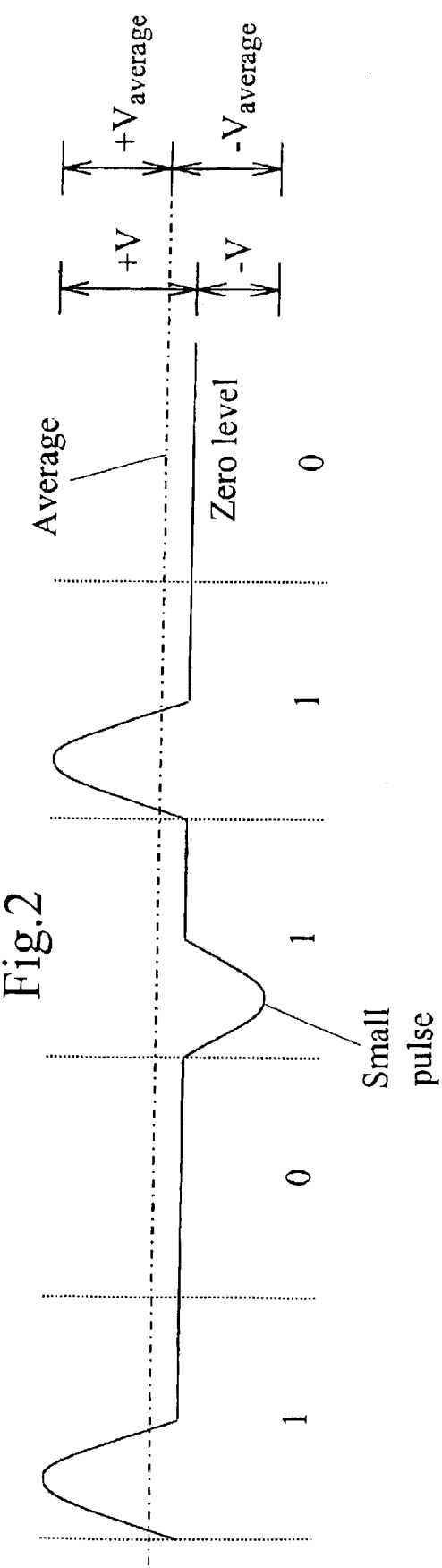

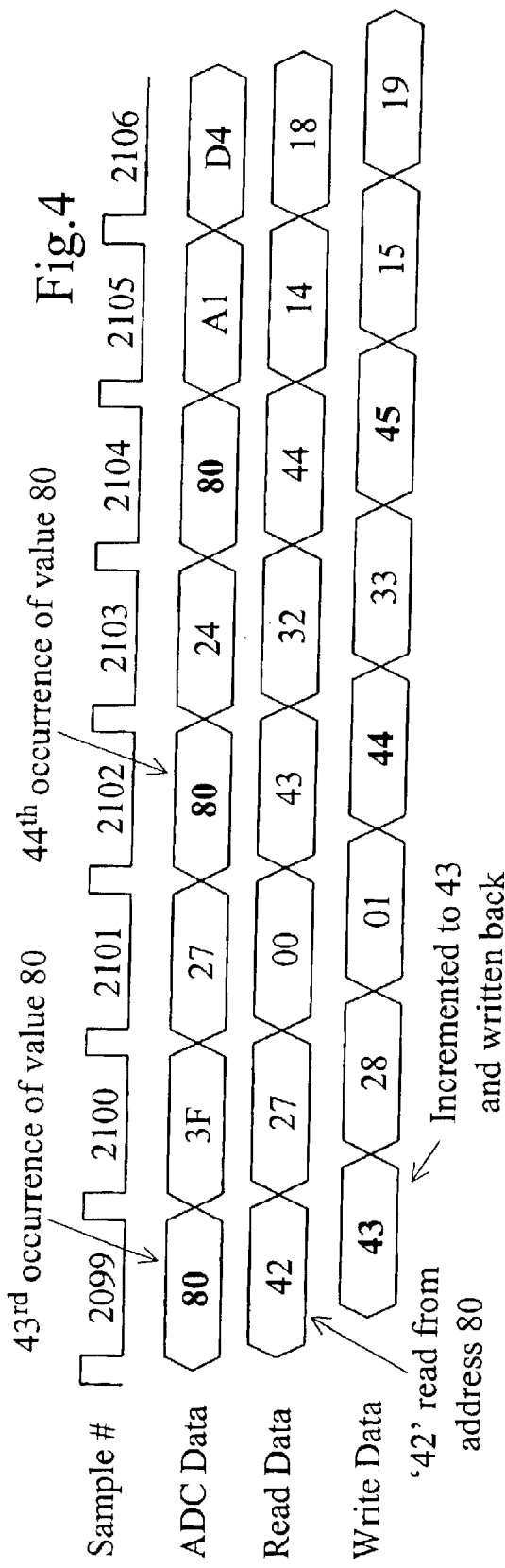
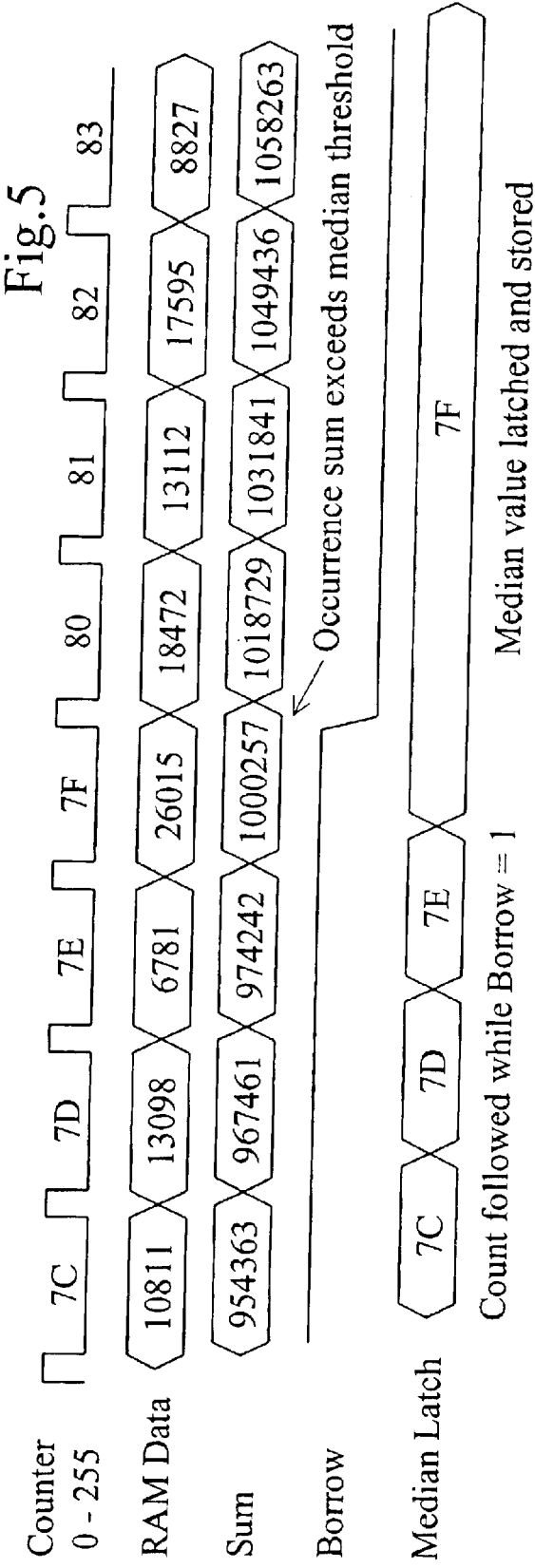

DETERMINING THE MAGNITUDE OF PULSES

TECHNICAL FIELD

This invention relates to methods and apparatus for determining the magnitude of pulses, and in particular for determining the magnitude of a pulse in a signal having both positive and negative polarity pulses.

BACKGROUND ART

The telecommunications Plesiochronous Digital Hierarchy (PDH) is widely used to transmit digital information (e.g. digitised telephone calls) along telephone cables at any of a number of standardised data rates. For rates of 44.768 MHz and below a ternary (three-level) signal waveform is used. In this waveform a logic 1 symbol is indicated by the presence of a pulse (relative to a predefined timebase) and a logic 0 symbol is indicated by the absence of a pulse. In general successive logic 1 symbols are represented by respective pulses of opposite polarity to one another. Thus a data signal is made up of positive and negative pulses indicating logic 1 symbols and gaps indicating logic 0 symbols.

Test equipment for monitoring the status of a PDH signal typically reports parameters such as frequency, jitter and voltage levels. The voltage levels reported are peak-to-peak, positive pulse magnitude and negative pulse magnitude. In a healthy signal the positive and negative pulse magnitudes are substantially identical. However, one possible indication of the presence of a fault is the occurrence of opposite-polarity pulse sizes which are not the same, and for this reason a measurement of the individual positive (+V) and negative (−V) pulse sizes is supplied.

These voltage measurements are usually made with analogue-to-digital converters (ADCs) which provide a digital output indicative of the analogue voltage at a particular instant. Low-cost ADCs are preferred for this purpose for reasons of economy, but they have a single supply voltage and polarity, and hence cannot directly accept the bipolar ternary PDH signal. Accordingly the bipolar signal is ac-coupled to the input of the ADC so that the dc offset between the zero voltage rail of the ADC and the maximum negative voltage of the incoming signal is removed. The average voltage of the ac-coupled input signal is regarded as representing the zero voltage level of the original bipolar signal, and this is valid if the signal is healthy.

Current test equipment uses the average voltage as the zero reference point relative to which the positive and negative voltage magnitudes are measured. However, if the positive and negative pulses are asymmetric in magnitude then the average voltage of the ac-coupled signal no longer corresponds to the zero voltage level. This gives rise to strange effects. For example, if the negative pulse magnitude varies, whilst the positive pulse magnitude does not, then the measured value for the positive voltage nonetheless also changes. This arises because of the variation in the average voltage resulting from the increase or decrease in the voltage excursions below the zero level.

SUMMARY OF THE INVENTION

The inventors hereof have realised that it is desirable instead to measure from the actual signal zero level. Even if the negative pulse magnitude is varied, the voltage range from the zero level to the positive pulse maximum stays the same. By measuring from the zero level of the signal, a truer indication of the magnitude of the positive and negative pulses is obtained.

According to one aspect of this invention there is provided a method of determining the magnitude of a pulse in a signal having both positive and negative polarity pulses, comprising the steps of:

measuring the magnitude of multiple samples of the signal;

determining from a plurality of the sample magnitudes a reference voltage level for the signal; and determining the magnitude of a pulse in the signal from the sample magnitudes and the reference voltage level.

The reference level may be determined from a median value of the plurality of sample magnitudes. In this case the method may be implemented by: counting occurrence of different sample magnitudes during a measurement interval; aggregating counts for different sample magnitudes taken in order at the end of the measurement interval, and comparing the aggregated count to a threshold value representing the median value; and selecting the sample magnitude whose corresponding count causes the aggregated count to attain or exceed the threshold value, as indicative of the reference level.

According to another aspect of this invention there is provided apparatus for determining the magnitude of a pulse in a signal having both positive and negative polarity pulses, comprising:

measuring means for measuring the magnitude of multiple samples of the signal;

reference determining means for determining from a plurality of the sample magnitudes a reference level for the signal; and magnitude determining means for determining the magnitude of a pulse in the signal from the sample magnitudes and the reference level.

The apparatus may further comprise: a counter for counting occurrence of different sample magnitudes during a measurement interval; an adder for aggregating the counts for different sample magnitudes taken in order at the end of the measurement interval; a comparator for comparing the aggregated count to a threshold value representing the median value; and a store for storing as the reference level the sample magnitude whose corresponding count causes the aggregated count to attain or exceed the threshold value.

BRIEF DESCRIPTION OF DRAWINGS

A method and apparatus in accordance with this invention, for measuring the voltage magnitudes of positive and negative pulses in a ternary PDH signal, will now be described, by way of example, with reference to the accompanying drawings, in which:

FIG. 1 shows the waveform of a ternary PDH signal;

FIG. 2 illustrates the possible effect of variations in the magnitude of pulses of one polarity on measurements of the pulse magnitudes;

FIGS. 4 and 5 are timing diagrams illustrating the operation of the circuit of FIG. 3.

DETAILED DESCRIPTION OF THE DRAWINGS

Figure 3:
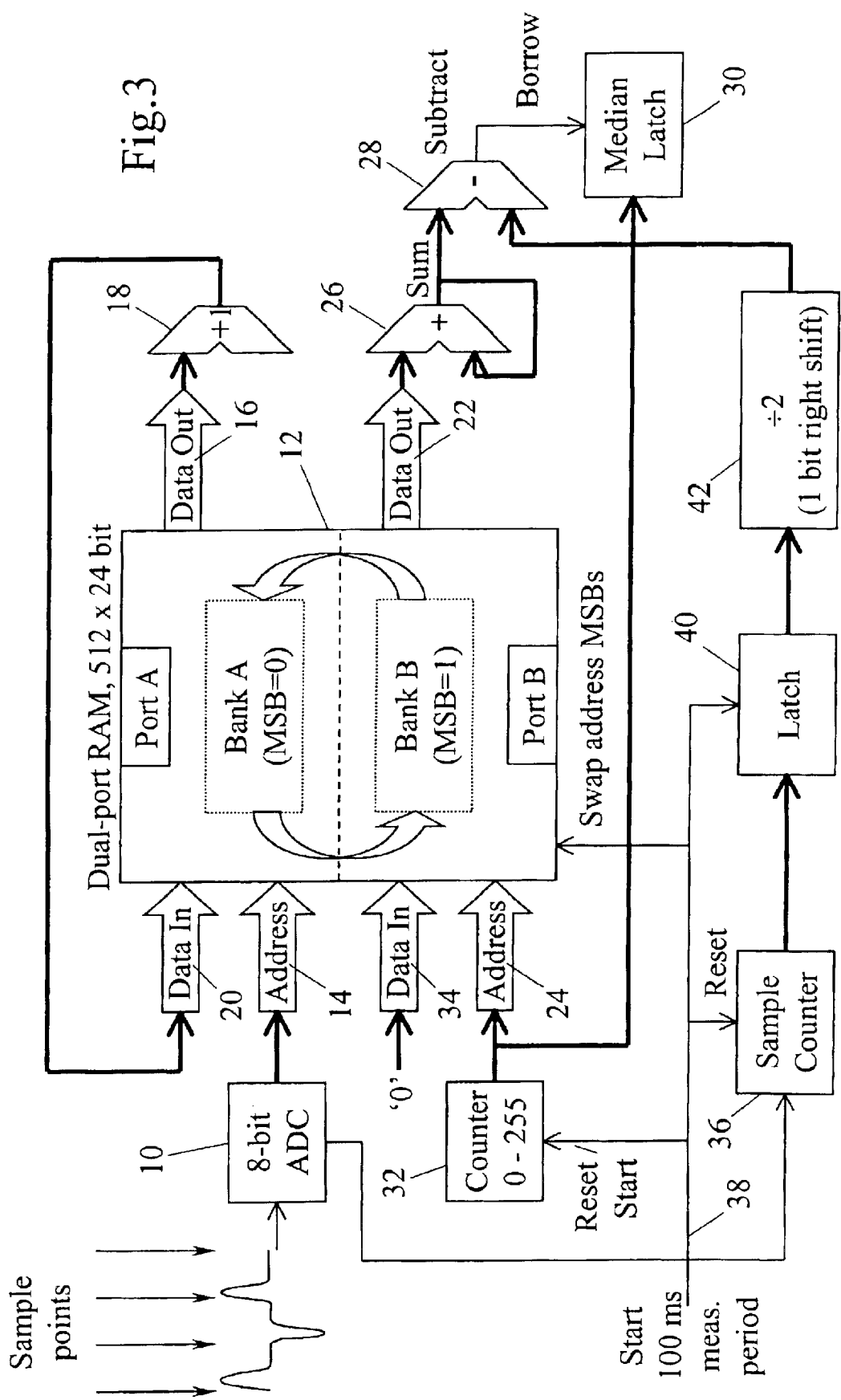
FIG. 3 is a block schematic diagram of a circuit for determining a reference voltage level for use in measuring the magnitude of pulses.

Referring to FIG. 1, a typical ternary PDH signal consists of equal numbers of positive and negative pulses corresponding to logic 1 symbols in the data stream represented by the signal. As generated each such pulse terminates half-way through the duration of a single pulse cycle (i.e. the signal is at zero voltage for the remainder of the cycle). Logic 0 symbols are represented by the absence of any pulse during a pulse cycle (i.e. the signal has zero voltage throughout the cycle).

In an ideal signal as shown in FIG. 1, the amplitudes +V and −V of the positive and negative pulses respectively have the same absolute magnitude. In practice error conditions can occur in which pulses of one polarity are smaller than those of the other polarity, as shown for example in FIG. 2 in which the negative pulses have an amplitude −V which is smaller than the amplitude +V of the positive pulses. The zero voltage level is unchanged, but the average signal level is shifted in a positive sense. In consequence any measurement of pulse amplitude relative to the average signal level results in a perturbed (reduced) value for $+V_{average}$, as well as an excessive value for $-V_{average}$. To obtain accurate measurements it is necessary to find and measure relative to the zero voltage level.

Because the ternary PDH signal is at the zero voltage level for part or all of each pulse cycle, the proportion of time for which signal has a value at or close to zero volts is greater than that for which it has any other value. The inventors hereof have realised that in a distribution of the values generated over time by an ADC receiving a ternary PDH signal, it is highly likely that the middle value (the median value) corresponds to the zero voltage level of the PDH signal. By recording of a set of ADC measurements over time and finding the median value, the signal's zero level can be found.

FIG. 3 is a block schematic diagram of a circuit for determining this median value and thus the zero level. In this circuit a zero level determination is made every 100 ms. The ADC included in the circuit can sample at rates up to 20 MHz, so in this case up to two million samples are processed each 100 ms to find the median. This large number of samples is an advantage, in that it contributes to accuracy of the median measurement. A number of samples of this order of magnitude is not essential, but a very small number of samples would be sensitive to the distribution of logic 1s and 0s in the sampled signal. The circuit is capable of finding the median value of a number of samples of the order of two million, where each sample can have any one of 256 values (for an 8-bit ADC). It comprises three adders, two counters and a dual-port random-access memory (RAM), and may be implemented, for example, using field-programmable gate array (FPGA) technology.

Referring to FIG. 3, the received ternary PDH signal is applied to an 8-bit ADC 10. A low cost ADC may be used, although typically such an ADC cannot run fast enough to take many samples in a cycle. Nonetheless, an ADC which takes one sample only every few PDH signal cycles is usable, if the timing of this sample is varied in a regular manner relative to the start point of the cycles such that, over time, samples are taken for positive and negative pulses and zero signal levels in relatively even distributions.

A RAM 12 has 512 memory locations each capable of storing a 24-bit value. This RAM is a dual-port type with individual data-in and data-out busses on each port. Both ports can access the memory locations simultaneously provided they do not try to write to the same memory location. The RAM 12 is notionally divided into two 256-location banks, A and B, which are selected according to the value of the most significant bit (MSB) of a 9-bit address value applied to the ports' address busses. This division of the RAM 12 into two banks enables collection of sample values to continue while a median value is being derived from a previous set of samples. One bank (e.g. the bank A) is used to accumulate samples while the other (the bank B) uses previously collected results to derive a median value. After each 100 ms interval the two banks are swapped over, by toggling the MSB values applied to the address bus ports, so that bank B now collects sample values while the median value of the samples in bank A is determined.

The least significant 8 bits of one port's address bus 14 receive the 8-bit digitised signal sample value from the ADC 10. An associated data-out port 16 of the RAM 12 is coupled to an adder 18 arranged to increment each value it receives by one and supply the incremented value to a corresponding data-in port 20 of the RAM. A second data-out port 22 of the RAM, associated with a second port's address bus 24, is coupled to a second adder 26 which has its output coupled back to a second input so that it can aggregate a succession of values output by the RAM 12. The aggregated value is also supplied to a third adder 28 used as a comparator to subtract a value received on a second input from that aggregated value. A borrow output from the adder/comparator 28 controls a median latch 30, which receives a series of values between 0 and 255 from a counter 32. This counter value is also applied to the RAM's second port address bus 24. The associated second data-in port 34 of the RAM 12 receives a fixed zero value.

As the ADC 10 generates each signal sample it supplies a signal indicative of this to a counter 36, which thus counts the total samples generated. A signal applied on a line 38 at the start of each 100 ms interval latches the sample count in a latch 40, resets the sample counter 36, resets and restarts the counter 32, and toggles the MSB values of the address busses 14 and 24 (to swap the banks A and B). The value stored in the latch 40 is applied to a divider 42 which shifts it one bit position to the right, thereby dividing it by two, and supplies the divided value as a threshold to the second input of the adder/comparator 28.

Each successive ADC output value is latched and defines the address of a memory location to be accessed in the current sample-accumulating RAM bank A or B. The number stored in this location is output to the adder 18 where the number is incremented by one. This incremented count is then written back to the same memory location. Referring to FIG. 4, this process is illustrated for the $2099^{th}$ sample, for which the ADC output value is 80. The number stored at address 80 in the RAM 12 is 42; this is read out, incremented, and the new value of 43 is written back to the same location.

As time progresses each successive ADC output value causes data at a corresponding memory location to be incremented. Thus at any given time during the sample accumulation phase, each memory location contains a count of the number of times the ADC has caused that location to be accessed, i.e. a count of the frequency of occurrence of the ADC value matching that location's address. For example, as shown in FIG. 4, for the $2102^{nd}$ and $2104^{th}$ samples, the ADC output is again equal to 80, thus causing the number stored at location 80 to be further incremented to 44 and then 45.

At the end of a 100 ms interval the signal on line 38 causes the RAM banks A and B to be swapped, so that analysis of the samples just accumulated to determine the median value can commence.

To this end the counter 32 supplies successive values to the address bus 24 of the bank containing those accumulated samples, starting at 0 and counting up to 255. As each value is applied to the address bus, the addressed data are fed via the data-out port 22 to the adder 26 for aggregation of the values read from RAM 12. Immediately after the data have been output the addressed location is written with 0 (applied via the data-in port 34) to clear the location in preparation for accumulation of further samples during the next following 100 ms interval. The aggregate value produced by the adder 26 is continuously compared by the adder/comparator 28 with the halved sample count supplied by the divider 42. As long as the aggregate value remains below half the sample count, the borrow output from the adder/comparator 28 remains at a logic high value. This high borrow output causes the median latch 30 to accept the successive address values being supplied by the counter 32 to the RAM bank containing the accumulated samples. When the aggregate value attains or exceeds the halved sample count, the borrow signal goes to logic low, so the latch 30 ceases updating and stores the most recently latched address value. The counter 32 continues counting to 255 to write the rest of the memory locations of the RAM bank it is addressing with zeroes.

FIG. 5 illustrates this process for the case where there is a total of 2,000,001 samples, so the median value (the value having equal numbers of samples above and below it) would be the 1,000,001$^{st}$ sample. In this example (an odd sample total) the threshold value supplied by the divider 42 to the adder/comparator 28 is 1,000,000 (because right-shifting a binary value to divide it by two ignores the value of the least significant bit). Although this threshold value differs slightly from the mathematically rigorous value for determining the median, the difference has no practical significance, especially in view of the relatively limited resolution of the ADC 10.

As the counter 32 supplies successive address values of 7C$_H$ (hexadecimal), 7D$_H$, 7E$_H$, 7F$_H$, 80$_H$ etc. to the RAM 12, corresponding data values (sample counts) of 10811, 13098, 6781, 26015, 18472 etc. are output to the adder 26. The data value of 26015 for address (sample value) 7F$_H$ causes the aggregate to rise from 974,242 to 1,000,257, thereby exceeding the threshold value and sending the borrow signal to its logic low value. Thus the median latch 30 ceases updating and stores the corresponding sample value of 7F$_H$ as the required median value.

This median value is then used by conventional circuitry (not shown) as the PDH signal zero reference level for deriving the magnitude of the positive and negative pulses in the signal, using samples from the output of the ADC 10 which are selected by that circuitry as representative of the peaks of those pulses during the corresponding 100 ms interval.

If the circuitry shown in FIG. 3 is operated at a clock rate of 80 MHz, the process of deriving the median value takes a maximum of (256*2)=512 clock cycles or around 6.4 μs. This is much less time than that typically required for the pulse-magnitude derivation circuitry to undertake its processing and reach the stage at which it needs the median value.

The invention has been described for convenience in the context of processing of ternary PDH signals. However it is equally applicable in relation to other signals having both positive and negative pulses whose magnitude it is desired to determine. Likewise, circuitry other than that described above with reference to FIG. 3 can be used to determine the required zero reference level.

What is claimed is:

1. A method of determining the magnitude of a pulse in a signal having both positive and negative polarity pulses, comprising the steps of:
    measuring the magnitude of multiple samples of the signal;
    determining a median value of a plurality of the sample magnitudes;
    determining from the median value of the plurality of the sample magnitudes a reference level for the signal; and
    determining the magnitude of a pulse in the signal from the sample magnitudes and the reference level.

2. The method of claim 1, wherein the magnitudes of both positive and negative pulses in the signal are determined.

3. The method of claim 1, wherein the sample magnitudes are in digital form.

4. The method of claim 3, including the steps of:
    counting occurrence of different sample magnitudes during a measurement interval;
    aggregating counts for different sample magnitudes taken in order at the end of the measurement interval, and comparing the aggregated count to a threshold value representing the median value; and
    selecting the sample magnitude whose corresponding count causes the aggregated count to attain or exceed the threshold value, as indicative of the reference level.

5. The method of claim 4, wherein the counts are aggregated for different sample magnitudes taken in order from the smallest magnitude towards the largest.

6. The method of claim 4, wherein the threshold value is taken as being half the total number of sample magnitudes measured during the measurement interval.

7. Apparatus for determining the magnitude of a pulse in a signal having both positive and negative polarity pulses, comprising:
    measuring means for measuring the magnitude of multiple samples of the signal;
    median determining means for determining a median value of a plurality of the sample magnitudes;
    reference determining means for determining from the median value of the plurality of the sample magnitudes a reference level for the signal; and
    magnitude determining means for determining the magnitude of a pulse in the signal from the sample magnitudes and the reference level.

8. The apparatus of claim 7, comprising:
    a counter for counting occurrence of different sample magnitudes during a measurement interval;
    an adder for aggregating the counts for different sample magnitudes taken in order at the end of the measurement interval;
    a comparator for comparing the aggregated count to a threshold value representing the median value; and
    a store for storing as the reference level the sample magnitude whose corresponding count causes the aggregated count to attain or exceed the threshold value.

* * * * *

UNITED STATES PATENT AND TRADEMARK OFFICE
CERTIFICATE OF CORRECTION

PATENT NO.  : 6,831,453 B2
DATED       : December 14, 2004
INVENTOR(S) : Johnstone et al.

It is certified that error appears in the above-identified patent and that said Letters Patent is hereby corrected as shown below:

<u>Title page,</u>
Insert Item: -- [30] Foreign Application Priority Data
       Nov. 16, 2001 [EP] Europe………..01309711.8 --

Signed and Sealed this

Ninth Day of August, 2005

JON W. DUDAS
*Director of the United States Patent and Trademark Office*